United States Patent [19]

Epstein et al.

[11] 4,354,959

[45] Oct. 19, 1982

[54] CATALYST FOR POLYMERIZING OLEFINS

[75] Inventors: Ronald A. Epstein; Robert I. Mink, both of Yonkers, N.Y.

[73] Assignee: Stauffer Chemical Company, Westport, Conn.

[21] Appl. No.: 289,446

[22] Filed: Aug. 3, 1981

[51] Int. Cl.$^3$ ................................................ C08F 4/64
[52] U.S. Cl. .............................. 252/429 B; 526/125; 526/114
[58] Field of Search ..................................... 252/429 B

[56] References Cited

U.S. PATENT DOCUMENTS

| | | | |
|---|---|---|---|
| 3,549,717 | 12/1970 | Itakura et al. | 252/429 B X |
| 4,013,823 | 3/1977 | Longi et al. | 252/429 B X |
| 4,069,169 | 1/1978 | Toyoda et al. | 252/429 B |
| 4,186,107 | 1/1980 | Wagner | 252/429 B |
| 4,222,894 | 9/1980 | Takahashi et al. | 252/429 B |
| 4,277,372 | 7/1981 | Matlack | 252/429 B |
| 4,294,948 | 10/1981 | Toyota et al. | 252/429 B X |

*Primary Examiner*—Patrick Garvin
*Attorney, Agent, or Firm*—Henry Z. Friedlander

[57] ABSTRACT

A catalytic system for polymerizing olefins comprises:
(a) a component containing an organoaluminum compound, and
(b) a component containing a titanium halide obtained by:
 (i) copulverizing a magnesium compound containing halogen or a manganese compound containing halogen with at least one electron-donor compound to produce a copulverized product,
 (ii) treating the copulverized product with an ether to produce a treated product, and
 (iii) reacting the treated product with a titanium chloride.

The novel catalytic system is useful for polymerizing olefins such as ethylene and propylene.

A process for producing the component containing a titanium halide is also provided.

44 Claims, No Drawings

CATALYST FOR POLYMERIZING OLEFINS

BACKGROUND OF THE INVENTION

This invention relates to a catalytic system for polymerizing olefins, a novel component of the system containing titanium halide, a process for preparing the novel component containing titanium halide, and the use of the system in polymerizing olefins, especially propylene.

The polymerization of olefins by coordinate complex catalytic systems, often termed Ziegler-Natta catalysis, has been well-known for over 25 years. Generally, there are two components in this type of system: one based on an organoaluminum compound or its substitute, the other containing a titanium or other transition metal halide. Although thousands of such catalytic systems have been disclosed, there is always a quest for improvement in two important properties: activity and isotactic index.

Activity is measured by the grams of polyolefin produced per gram of titanium component or other transition metal component employed in the catalytic system. The higher the activity, the lower the amount of metallic ash and corrosive halide left in the polymer. If the activity is high enough, e.g. $\geq 3,000$, then the de-ashing step in processing the final polyolefin can be omitted—an important improvement.

For olefins, such as propylene, which can form isotactic structures, the higher the isotactic index, the better the physical properties of the polymer. Isotactic polypropylene is more ordered, less soluble in halocarbons or hydrocarbons, and useful for its higher strength than the more soluble atactic form. Isotactic indices of 93 or higher are favored for commercial polypropylene. ;p Previously Kashiwa et al. disclosed in U.S. Pat. No. 3,642,746 a process for polymerizing olefins by means of a catalytic component supported on a metal dihalide, which had been treated with an electron-donor compound and then reacted with either titanium tetrachloride or vanadium tetra- or pentachloride. Among the electron-donor compounds are aliphatic and cyclic ethers.

Yamaguchi et al. disclose in U.S. Pat. No. 3,989,881 a component used for polymerizing olefins comprising a solid ethereal complex of magnesium halide and titanium/vanadium halide, which may be obtained by milling the ethereal complexes of magnesium halide and the transition metal halide.

Hirota et al. disclose in U.S. Pat. No. 4,180,636 a copulverized polymerization component obtained by milling a magnesium halide support with an aromatic additive, a mixture of titanium tetrahalide and an electron donor, which may be an ether, plus an organoaluminum compound activated by an aromatic carboxylic ester.

Wagner discloses in U.S. Pat. No. 4,186,107 a coordinate complex polymerization catalyst employing a component of titanium halide on a magnesium chloride support, prepared by the reduction of a magnesium alkyl with an aluminum alkyl halide followed by optional post treatment with a dialkyl ether.

Sunada et al. in Belgian published patent application No. 880,807 of Apr. 17, 1980 based on Japanese patent application No. 79/152,818 of Nov. 26, 1979 (see C.A., Vol. 93, 240287N) disclose a component for a polymerization catalyst prepared by heating titanium tetrachloride, an ether, and an organoaluminum compound in an aliphatic hydrocarbon solvent containing a haloarene, cooling the mixture below 40° C., adding an ether plus titanium tetrachloride then heating the solution, and then repeating the cooling/heating cycle one or more times with repeated additions of both ether and titanium tetrachloride.

All five of the disclosures above are incorporated by reference into this application.

It is an object of this invention to provide a catalytic system for polymerizing olefins, such as propylene, so that de-ashing may be omitted and product with high isotactic index prepared. Other objects of the present invention will be apparent to those skilled in the art.

SUMMARY OF THE INVENTION

Surprisingly, both a high activity and high isotactic index (II) can be achieved by employing the novel catalyst of the present invention for the polymerization of olefins, particularly propylene. The novel catalytic system comprises:
  (a) a component containing an organoaluminum compound, and
  (b) a component containing a titanium halide obtained by:
    (i) copulverizing a magnesium compound containing halogen or a manganese compound containing halogen with at least one electron-donor compound to produce a copulverized product,
    (ii) treating the copulverized product with an ether to produce a treated product, and
    (iii) reacting the treated product with a titanium chloride.

For another aspect of the present invention the novel component containing a titanium halide and a process for producing the novel component containing a titanium halide are provided.

For still another aspect of the present invention a process for employing the novel catalytic system to polymerize olefins is provided.

DETAILED DESCRIPTION OF THE INVENTION

The present invention is broadly applicable to the polymerization of monomeric olefins especially 1-olefins including ethylene, dienes especially conjugated ones such as butadiene, and those other olefins which are only marginally polymerizable, such as 2-butene. The preferred monomeric olefins are those corresponding to the formula $R-CH=CH_2$, wherein R is an alkyl radical containing up to 12 carbon atoms inclusive and hydrogen. Among the preferred, monomeric olefins are ethylene, propylene, 1-butene, 1,4-butadiene, 1-pentene, 4-methyl-1 pentene, 1-hexene, and the like. These monomers may be employed individually or in comonomeric mixtures such as ethylene/propylene, ethylene/propylene/butadiene, and the like.

Although for illustrating the present invention the polymerization of propylene is described herein as an example, the invention is by no means limited to any one monomeric olefin.

The component (a) containing an organoaluminum compound is well-known to those skilled in the art of coordinate complex (Ziegler-Natta) addition polymerization. The component may be selected from the following compounds: trialkyl aluminums such as triethylaluminum, triisobutylaluminum, and trihexylaluminum, dialkyl aluminum halides such as diethylaluminum chloride, diethylaluminum bromide, and dibutylaluminum chloride, alkylaluminum sesquihalides such as ethylaluminum sesquichloride, alkylaluminum dihalides such as ethylaluminum dichloride, ethylaluminum difluoride, and butylaluminum dichloride, and dialkylaluminum alkoxides such as diethylaluminum ethoxide, diethylaluminum butoxide, and diethylaluminum phenoxide.

An electron donor such as an alkyl ester of an aromatic acid may be used in conjunction with component (a). Methyl toluate and ethyl anisate are examples of such electron donors. Electron donors in component (a) are advantageously used in molar ratio from about 1:10 to 1:1 with respect to the aluminum alkyl.

The first step (i) in obtaining component (b) containing a titanium halide is copulverization of a magnesium compound or a manganese compound or a mixture thereof containing halogen as a support with one or more electron donors and optionally a pulverization aid.

The preferred support for practicing the instant invention is anhydrous magnesium dichloride, but other support materials may be selected from magnesium hydroxychloride, magnesium alkoxychloride, magnesium bromide, magnesium hydroxybromide, magnesium alkoxybromide; manganese chloride, manganese bromide, manganese hydroxychloride, manganese hydroxybromide, and manganese alkoxyhalide. Magnesium phenoxy halide and magnesium substituted phenoxy halides may also be used. Preferred substituents in the phenoxy moiety are alkyl groups containing 1 to 5 carbon atoms, halogen groups such as chloride or bromine, and the nitro group. As in chloro-substituted phenoxy magnesium compounds, the magnesium or manganese compound containing halogen need not have the halogen atom directly bonded to the magnesium or manganese atom.

The support, chosen from the halogenated materials cited above, may also be partially converted to alcoholate or carbonate groups. Furthermore, the support may contain diluents, up to about 70 percent, of inert, powdered material such as inorganic carbonates, sulfates, borates, or oxides. Examples of such diluents are dry NaCl, KCl, LiCl, CaCO$_3$, BaCO$_3$, Na$_2$SO$_4$, K$_2$SO$_4$, Na$_2$CO$_3$, K$_2$CO$_3$, Na$_2$B$_4$O$_7$, CaSO$_4$, B$_2$O$_3$, Al$_2$O$_3$, SiO$_2$, TiO$_2$ and the like.

The copulverization may be carried out in any suitable milling equipment such as a ball mill, a hammer mill, a vibratory mill, a grinding mill, or the like. The purpose of the copulverization is to bring the reagents into more intimate contact than the usual mixing step, which is intended only to create physical homogeneity. Use of a ball mill is preferred, especially employing stainless steel balls, but ceramic, glass, or balls of other material may be substituted.

Copulverization may be carried out in the presence of an organic or inorganic pulverization aid which may be simple compounds or polymers. Representative pulverization aids are kerosene, polystyrene, polypropylene, organosiloxanes, boron oxide, silicon oxide and aluminum oxides. Of the cited pulverization aids the polysiloxanes, which also have electron-donating properties, are preferred. From about 0.001 to about equal weight of such pulverization aid may be used in each charge milled.

The amount of electron-donor compound used in the step (i) copulverization is from about 0.001 to about 1 mole per mole of the magnesium or manganese compound containing halogen acting as the support. Preferably, about 0.01 to about 0.1 mole electron-donor per mole of support material is used.

Electron-donors are compounds, usually but not necessarily organic, containing one or more oxygen, nitrogen, phosphorus, silicon or sulfur atoms which can form complexes with the magnesium or manganese support materials containing halogen atoms. Often the electron donors are termed Lewis bases, since the support materials containing halogen atoms often are Lewis acids.

Among the classes of compounds containing oxygen suitable for furnishing electron-donors are: aliphatic and aromatic ethers, aliphatic carboxylic esters, aromatic carboxylic esters, cyclic esters or carbonic acid, alcohols, phenols, aldehydes, ketones, aliphatic and aromatic carboxylic acids, lactones, and carboxylic acyl halides. Of these the aromatic carboxylic acids are preferred.

Among the classes of compounds containing nitrogen suitable for furnishing electron-donors are: aliphatic amines and polyamines, aromatic amines, heterocyclic amines, nitriles, carbamates, aromatic isocyanates, and aromatic azo compounds. Electron-donors containing both oxygen and nitrogen atoms may be used such as aliphatic and aromatic amides, nitrocompounds, or guanidine and its alkyl-substituted derivatives.

Other classes of electron-donors include phosphines, phosphoroamides, sulfides, mercaptans, thioethers, thioesters, organoalkoxysilanes, organoaryloxysilanes, aminosilanes, organosilicon isocyanates, and organopolysilanes, organopolysiloxanes, and polysilazines.

Examples of electron-donor compounds from some of the classes listed above are: ethyl benzoate, ethyl anisate, ethyl toluate, ethyl acetate, diethyl carbonate, γ-butyrolactone, benzoic acid, toluic acids, acetone, acetophenone, nitrobenzene, veratrol, tetramethylenediamine, dimethyl acetamide, methyl carbamate, toluene diisocyanate, benzonitrile, N-methyl pyrrolidone, phenol, and thiophenol. Especially preferred among these electron-donors is ethyl benzoate and the toluic acids.

The electron-donor may be placed in the pulverizing apparatus before, during, or after some of the pulverizing time, as long as the support and the electron-donor are intimately contacted during some of the pulverization. More than one electron-donor may be used and the several donors may be added in any convenient fashion. The pulverization aid may also function as an electron-donor. The use of from about 0.01 to about 1 mole of electron-donor per mole of support material is preferred.

In the process of this invention after the copulverization of a magnesium or manganese support material containing halogen with one or more electron donors the product is treated with an ether to form unknown amounts of complex treated product.

Treatment with an ether can take place at any temperature between about 0° and about 200° C., but a treatment temperature between about 50° and 100° C. is preferred depending on the boiling point of the ether. Depending on the temperature of treatment, the treatment time can vary from a few minutes to a day or more with shorter treatment times being more appropriate with higher treatment temperatures. The preferred time is from about one-half to about four hours. Especially preferred is a treatment time from one to three hours at about 50° to about 60° C. Normally a large excess of ether is employed as the treating medium, but inert hydrocarbon diluents may also be employed in the ether.

Symmetrical or asymmetrical ethers may be chosen especially those with hydrocarbyl radicals, that is aliphatic, cycloaliphatic or aromatic moieties. The hydrocarbyl radicals may have substituents, however, such as halogen, nitro, cyano or other hydrocarbyl groups which are nonreactive during the processing of the catalyst support and the subsequent polymerization of olefins. The ether may bear heterocyclic groups such as pyridyl or thienyl.

Some representative ethers suitable for post-treating the copulverized support material are dimethyl ether, methyl ethyl ether, diethyl ether, dipropyl ether, diisopropyl ether, dibutyl ether, diisobutyl ether, diisoamyl ether, dioctyl ether, didodecyl ether, diallyl ether, isobutyl vinyl ether, dioxane, lower polyethylene glycols up to about 500 molecular weight, lower polypropylene glycols up to about 600 molecular weight, ethylene glycol dimethyl ether, ethylene glycol diethyl ether, ethoxyethoxyethylene glycol ethyl ether, tetrahydrofuran, diphenyl ether, ditolyl ether, anisole, dimethoxybenzene, tetrahydrofuran. Among the ethers aliphatic compounds are preferred. Especially preferred is di-n-butyl ether.

After treatment with the ether the support material is normally filtered, washed with a volatile hydrocarbon solvent such as heptane, and vacuum dried. No one or all of these three steps is necessary, however, for carrying out the process of this invention. If convenient, separation, washing, and drying is preferred.

The third major step in the process of this invention is reaction with a titanium compound in order to prepare the titanium component of the coordinate complex polymerization catalyst.

The titanium compound employed for the reactive step may be represented by the formula:

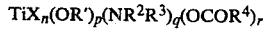

$$TiX_n(OR')_p(NR^2R^3)_q(OCOR^4)_r$$

wherein X is a chlorine, bromine, or iodine atom; $R'$, $R^2$, $R^3$, and $R^4$ may be the same or different and are hydrocarbyl radicals having from 1 to about 12 carbon atoms; n is a number from 1 to 4; p, q, and r are numbers from 0 to 3, and $n+p+q+r$ is 4.

Some examples of titanium halocompounds useful in performing the reactive step are titanium tetrachloride, titanium tetrabromide, titanium tetraiodide, methoxytitanium trichloride, dimethoxy titanium dichloride, ethoxytitanium trichloride, dimethylaminotitanium trichloride, bis(dimethylamino)titanium dichloride and titanium benzoate trichloride. Preferably the reactive titanium compound is a liquid, but this is not necessary if a convenient, inert solvent can be found for the reagent. The titanium compound can be employed neat or in a suitable solvent. The ratio of titanium compound to magnesium support material can range from about 0.1 to about 100 molar.

Titanium trichloride material may also be used.

The titanium reaction can be carried out at any temperature from about 25° to about 200° C., but temperatures from about 75° to about 150° C. are preferred. This reaction can be carried out from a few minutes to several hours, but a reaction time of one-half to four hours is preferred.

After the pulverization, ether-treating, and titanium-reaction steps, the product is preferably separated from the liquid medium, washed with an inert solvent such as heptane, and dried, preferably by vacuum drying at ambient temperature. Because this supported titanium catalyst component is sensitive to air and moisture it should be stored in a dry, inert atmosphere.

The titanium catalyst component which is a product of the process of the present invention may be used along with a suitable organoaluminum compound as a catalyst for the polymerization of olefins such as ethylene, propylene, butene and butadiene, or copolymers of these olefins with each other and other olefins, in the coordinate complex (Ziegler-Natta) type of polymerization in conventional fashion, as is well-known. This polymerization is illustrated in the Examples. The molar ratio of organoaluminum compound to titanium in the treated and modified titanium component of the present invention may range from about 2000:1 to about 0.5:1; the preferred molar ratio is from about 200:1 to about 100:1.

Having described the present invention above, we now illustrate it in the following Examples. These Examples, however, do not limit the present invention, which may be carried out by other means but still remain within the scope of the present disclosure.

EXAMPLE 1

This Example illustrates preparation of the titanium component of the present invention.

Into a 1-liter stainless steel ball mill were placed 45 g. anhydrous magnesium chloride, 11 g. ethyl benzoate, 2.8 g. silicone oil (General Electric Co., SF 96-100) and 1750 g. stainless steel 1.5-cm balls. The mill was rotated for 96 hours at about 50 rpm. Ten grams of the product of the pulverizing step was suspended in 100 ml. heptane in a 250-ml. three-necked flask equipped with a magnetic stirrer and a thermometer. The contents were heated to 55° C. and then 10.2 g. di-n-butyl ether was added, the temperature being maintained with stirring for two hours. After this treatment step the mixture was cooled, filtered, washed with 800 ml. heptane, and vacuum-dried at 0.1 torr for 17 hours (overnight). The product was then sieved through a U.S. standard 140-mesh screen.

An aliquot of 5.1 g. of the pulverized and treated product was then caused to react with 85 ml. of neat $TiCl_4$ at 95° C. in a stirred vessel for about 1½ hours. The mixture was cooled, filtered, the product washed with heptane, vacuum dried, and sieved through a 140-mesh screen. The product was 4.4 g. of a pale yellow powder, sensitive to air and moisture.

EXAMPLE 2

This Example illustrates standard test conditions for slurry polymerization, one of the techniques for utilizing the present invention.

A polymerization reactor in the form of a four-liter, jacketed autoclave was equipped with a heater, purging ports, thermocouple, and mechanical stirrer. It was charged with two liters of dry heptane and brought to 50°±5° C. A nitrogen purge was commenced, and a weighed quantity of the organoaluminum compound was added by syringe and stirred for about 10 seconds. Then a weighed amount of the electron donor was added through the entry port, and the reaction mixture stirred for about 10 seconds again. At this point the solid titanium component of the catalyst system, as made in Example 1, was added. Monomer-grade propylene was then pumped into the reactor until a pressure of 10 atmospheres was reached at 65° C. During the polymerization more propylene was added to maintain the pressure at 10 atmospheres at 65° C. for 1½ hours, the duration of the standard test.

After the 1½ hour standard test the polymer was filtered, washed with isopropyl alcohol, oven-dried at 70° C., and weighed, thus giving a weight termed Dry Polymer. In order to determine the amount of heptane-soluble polymer formed the reaction solvent filtrate was evaporated to dryness.

EXAMPLE 3

This Example illustrates standard test conditions for bulk polymerization, another technique for utilizing the present invention.

As in Example 2, a 2.8 l. jacketed autoclave was equipped with a heater, purging ports, thermocouple, and mechanical stirrer. The nitrogen purge, addition of organoaluminum compound, electron donor, and titanium component of the present invention was carried out as in Example 2. Then 2 l. of liquid propylene was added and brought to 70° C. Again the standard polymerization test was run for 1½ hours. At the end of the polymerization time excess propylene was vented from the reactor. The polymer was collected, dried at 70° C., and weighed to give the amount of Dry Polymer.

For both the slurry test of Example 2 and the bulk polymerization of Example 3, the activity of the titanium component of the present invention was defined as follows:

$$\text{Activity}\left(\frac{\text{g polymer}}{\text{g catalyst component}}\right) = \frac{\text{Dry Polymer (g) plus Heptane-Soluble Polymer (g)}}{\text{Titanium Component (g)}}$$

The amount of polymer insoluble in heptane was determined by a three-hour extraction at the boiling point of heptane and termed "$C_7$". Isotactic Index (II) percentage was then defined as:

$$II = \frac{\text{"}C_7\text{"} \times \text{Dry Polymer (g)}}{\text{Total Polymer Produced (g)}} \times 100$$

EXAMPLE 4

This Example illustrates the use of the component of the present invention, prepared in Example 1, to polymerize propylene in a slurry, as described in Example 2.

The procedure of Example 2 was followed employing the following catalytic components. The titanium component (catalyst) was 50 mg. of the yellow powder prepared in Example 1. The aluminum component (co-catalyst) was a 4:1 molar ratio of 12 mmol triethylaluminum and 3 mmol methyl p-toluate.

When the treatment with n-butyl ether was included, the results were 5016 g. polypropylene per g. titanium catalyst (activity) and an Isotactic Index (II) of 96.7.

When another standard polymerization was carried out under the same conditions as above but employing a titanium control catalyst which had not received the ethereal treatment of the present invention the activity/II figures of merit were 5374/95.3.

EXAMPLES 5–9

These Examples illustrate further embodiments of the present invention, all carried as in Example 4, but using different electron donors.

In each case a weighed amount of $MgCl_2$ was milled with an oxygenated electron donor and silicone oil adjuvent under the action of stainless steel balls. The product was washed with heptane, sieved, and weighed.

An aliquot of the product was treated with 10.2 g. di-n-butyl ether for 1½ hours at 55° C., washed with 800 ml. heptane, dried, and sieved. Another control aliquot was not treated with ether. Both aliquots were than individually reacted with 85 ml. $TiCl_4$ at 95° C. for about 2 hours, washed with 700 ml. heptane, dried, sieved and weighed. The Activity and Isotactic Index for both the product of the present invention and the control are given below:

| Example | $MgCl_2$ (g) | Donor (g) | Milling Time(hr) | Silicone Oil(g) | Wgt. Ether Treated(g) | Wgt. Ether and Post-Treated(g) | Invention Activity/II | Control Activity/II |
|---|---|---|---|---|---|---|---|---|
| 5 | 20 | ethyl benzoate 2.4 | 144 | 2.8 | 10 | 5.3 | 6752/95.5 | 7850/94.1 |
| 6 | 30 | benzoic acid 0.8 | 168 | 4.2 | 10 | 5.2 | 3644/94.9 | 5423/89.1 |
| 7 | 20 | o-toluic acid 0.6 | 164 | 2.8 | 5.2 | 4.0 | 4502/94.4 | 6165/87.6 |
| 8 | 20 | m-toluic acid 0.6 | 144 | 2.8 | 5.2 | 5.1 | 4761/93.0 | 5021/86.1 |
| 9 | 20 | p-toluic acid 0.6 | 139 | 2.8 | 5.2 | 3.5 | 4386/94.9 | 4867/87.9 |

One sees that for the important property of Isotactic Index in each case the polymerization employing the catalytic titanium component of the present invention gives a higher value than the control.

Having illustrated the invention, what we seek by grant of letters patent may be described by the following claims.

We claim:

1. A catalytic system for polymerizing olefins comprising:
   (a) a component containing an organoaluminum compound, and
   (b) a component containing a titanium halide obtained by:
      (i) copulverizing a magnesium compound containing halogen compound or manganese compound containing halogen with at least one electron-donor compound to produce a copulverized product,
      (ii) treating the copulverized product with an ether to produce a treated product, and
      (iii) reacting the treated product with a titanium halide compound.

2. The catalytic system of claim 1 wherein copulverizing step (i) is carried out in the presence of an effective amount of a pulverization aid.

3. The catalytic system of claim 2 wherein the pulverizing aid is selected from the group consisting of hexane, heptane, kerosene, polystyrene, polypropylene, boron oxide, silicon oxide, and organopolysiloxanes.

4. The system of claim 2 wherein the effective amount of pulverization aid is from about 0.001 to about 1 times the weight of the magnesium compound containing halogen or manganese compound containing halogen.

5. The catalytic system of claim 1 wherein the magnesium compound containing halogen is magnesium dichloride.

6. The catalytic system of claim 1 wherein at least one electron-donor compound is an aromatic carboxylic acid employed in an amount of about 0.01 to about 1 mole of acid per mole of magnesium compound containing halogen or manganese compound containing halogen.

7. The system of claim 1 wherein at least one electron-donor compound is an aromatic carboxylic acid having up to 24 carbon atoms.

8. The system of claim 7 wherein at least one electron-donor compound is a toluic acid.

9. The system of claim 1 wherein at least one electron-donor compound is ethyl benzoate.

10. The catalytic system of claim 1 wherein the ether is selected from the group consisting of aliphatic ethers containing up to 12 carbon atoms, halogenated aliphatic ethers containing up to 12 carbon atoms, aliphatic glycol ethers or half-ethers containing up to 12 carbon atoms, alicyclic ethers containing up to 10 carbon atoms, halogenated alicyclic ethers containing up to 10 carbon atoms, aromatic ethers containing up to 18 carbon atoms, and halogenated aromatic ethers containing up to 18 carbon atoms.

11. The system of claim 1 wherein the ether is a symmetrical aliphatic ether.

12. The system of claim 11 wherein the symmetrical aliphatic ether is di-n-butyl ether.

13. The system of claim 1 wherein the titanium halide compound is titanium tetrachloride.

14. The system of claim 1 wherein the titanium halide compound is titanium trichloride material.

15. The system of claim 1 wherein the quantity of titanium present in the component containing a titanium halide is from about 0.1 percent to about 10 percent by weight expressed as elemental titanium.

16. A component containing titanium halide of a catalytic system for polymerizing olefins obtained by:
(a) copulverizing a magnesium compound containing halogen or a manganese compound containing halogen with at least one electron-donor compound to produce a copulverized product,
(b) treating the copulverized product with an ether to produce a treated product, and (c) reacting the treated product with a titanium halide compound.

17. The component of claim 16 wherein the copulverizing step (a) is carried out in the presence of an effective amount of a pulverization aid.

18. The component of claim 17 wherein the pulverization aid is selected from the group consisting of hexane, heptane, kerosene, polystyrene, polypropylene, boron oxide, silicon oxide, and organopolysiloxanes.

19. The component of claim 17 wherein the effective amount is from about 0.001 to about 1 times the weight of the magnesium compound containing halogen or manganese compound containing halogen.

20. The component of claim 16 wherein the magnesium compound containing halogen is magnesium dichloride.

21. The component of claim 16 wherein at least one electron-donor compound is an aromatic carboxylic acid employed in an amount of about 0.01 to about 1 mole of acid per mole of magnesium compound containing halogen or manganese compound containing halogen.

22. The component of claim 16 wherein at least one electron-donor compound is an acid selected from the group consisting of aliphatic carboxylic acids containing up to 18 carbon atoms, halogenated aliphatic carboxylic acids containing up to 18 carbon atoms, alicyclic carboxylic acids containing up to 12 carbon atoms, and aromatic carboxylic acids containing up to 24 carbon atoms.

23. The component of claim 22 wherein at least one electron-donor compound is a toluic acid.

24. The component of claim 16 wherein at least one electron-donor compound is ethyl benzoate.

25. The component of claim 16 wherein the ether is selected from the group consisting of aliphatic ethers containing up to 12 carbon atoms, halogenated aliphatic ethers containing up to 12 carbon atoms, aliphatic glycol ethers or half-ethers containing up to 12 carbon atoms, alicyclic ethers containing up to 10 carbon atoms, halogenated alicyclic ethers containing up to 10 carbon atoms, aromatic ethers containing up to 18 carbon atoms, and halogenated aromatic ethers containing up to 18 carbon atoms.

26. The component of claim 16 wherein the ether is a symmetrical aliphatic ether.

27. The component of claim 26 wherein the symmetrical aliphatic ether is di-n-butyl ether.

28. The component of claim 16 wherein the titanium halide compound is titanium tetrachloride.

29. The component of claim 16 wherein the titanium halide compound is titanium trichloride material.

30. The component of claim 16 wherein the quantity of titanium present in the titanium halide is from about 0.1 percent to about 10 percent by weight expressed as elemental titanium.

31. A process for producing a component containing titanium halide of a catalytic system for polymerizing olefins comprising:
(a) copulverizing a magnesium compound containing halogen or a manganese compound containing halogen with at least one electron-donor compound to produce a copulverized product,
(b) treating the copulverized product with an ether to produce a treated product, and
(c) reacting the treated product with a titanium halide compound.

32. The process of claim 31 wherein the copulverizing step (a) is carried out in the presence of an effective amount of a pulverization aid.

33. The process of claim 31 wherein the pulverizing aid is selected from the group consisting of hexane, heptane, kerosene, polystyrene, polypropylene, boron oxide, silicon oxide, and organopolysiloxanes.

34. The process of claim 31 wherein the effective amount is from about 0.001 to about 1 times the weight of the magnesium compound containing halogen or manganese compound containing halogen.

35. The process of claim 31 wherein the magnesium compound containing halogen is magnesium dichloride.

36. The process of claim 31 wherein at least one electron-donor compound is an aromatic carboxylic acid employed in an amount of about 0.01 to about 1 mole of acid per mole of magnesium compound containing halogen or manganese compound containing halogen.

37. The process of claim 31 wherein at least one electron-donor compound is a toluic acid.

38. The process of claim 31 wherein at least one electron-donor compound is ethyl benzoate.

39. The process of claim 31 wherein the ether is selected from the group consisting of aliphatic ethers containing up to 12 carbon atoms, halogenated aliphatic ethers containing up to 12 carbon atoms, aliphatic glycol ethers or half-ethers containing up to 12 carbon atoms, alicyclic ethers containing up to 10 carbon atoms, halogenated alicyclic ethers containing up to 10 carbon atoms, aromatic ethers containing up to 18 carbon atoms, and halogenated aromatic ethers containing up to 18 carbon atoms.

40. The process of claim 39 wherein the ether is a symmetrical aliphatic ether.

41. The process of claim 40 wherein the symmetrical aliphatic ether is di-n-butyl ether.

42. The process of claim 31 wherein the titanium halide compound is titanium tetrachloride.

43. The process of claim 31 wherein the titanium halide compound is titanium trichloride material.

44. The process of claim 31 wherein the quantity of titanium present in the titanium halide is from about 0.1 percent to about 10 percent by weight expressed as elemental titanium.

* * * * *

UNITED STATES PATENT AND TRADEMARK OFFICE
CERTIFICATE OF CORRECTION

PATENT NO. : 4,354,959
DATED : October 19, 1982
INVENTOR(S) : Ronald A. Epstein et al.

It is certified that error appears in the above—identified patent and that said Letters Patent is hereby corrected as shown below:

Col. 1, line 26, "$\geq$" before "3,000" should read -- $\geq$ --; and

Col. 1, line 36, "; p" before "Previously" should not appear in the printed text.

Signed and Sealed this

Third Day of May 1983

[SEAL]

Attest:

GERALD J. MOSSINGHOFF

Attesting Officer

Commissioner of Patents and Trademarks